US007200803B2

(12) United States Patent
Sellers et al.

(10) Patent No.: US 7,200,803 B2
(45) Date of Patent: Apr. 3, 2007

(54) SYSTEM AND METHOD FOR VISUALLY CATEGORIZING ELECTRONIC NOTES

(75) Inventors: Timothy D. Sellers, Bellevue, WA (US); Owen C. Braun, Seattle, WA (US); Peter L. Engrav, Seattle, WA (US); Myung Sub Kim, Redmond, WA (US); Christopher H. Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 10/184,365

(22) Filed: Jun. 27, 2002

(65) Prior Publication Data

US 2004/0001093 A1 Jan. 1, 2004

(51) Int. Cl.
*G06F 17/00* (2006.01)
(52) U.S. Cl. ...................... 715/512; 715/526
(58) Field of Classification Search ................ 715/512, 715/526
See application file for complete search history.

(56) References Cited

U.S. PATENT DOCUMENTS

| | | | | |
|---|---|---|---|---|
| 5,457,476 A | * | 10/1995 | Jenson | 715/823 |
| 5,612,719 A | * | 3/1997 | Beernink et al. | 345/173 |
| 5,623,679 A | * | 4/1997 | Rivette et al. | 715/526 |
| 5,798,758 A | * | 8/1998 | Harada et al. | 715/863 |
| 5,809,318 A | * | 9/1998 | Rivette et al. | 715/512 |
| 6,097,392 A | * | 8/2000 | Leyerle | 715/863 |
| 6,243,724 B1 | * | 6/2001 | Mander et al. | 715/526 |
| 6,351,259 B2 | * | 2/2002 | Breiner | 345/173 |
| 6,763,496 B1 | * | 7/2004 | Hennings et al. | 715/501.1 |
| 6,877,137 B1 | * | 4/2005 | Rivette et al. | D26/85 |

OTHER PUBLICATIONS

Microsoft, Microsoft Word 2000, 1999, Microsoft Corporation, 9.0.6926 SP-3.*
Bill N. Schilit, Gene Golovchinsky, Morgan N. Price, Beyond paper: supporting active reading with free form digital ink annotations, Apr. 1998, ACM Press/Addison-Wesley Publishing Co., Conference on Human Factors in Computing Systems, pp. 249-256.*
Daryl T. Lawton, Ian E. Smith, The Knowledge Weasel hypermedia annotation system, Dec. 1993, ACM Press, Conference on Hypertext and Hypermedia—Proceedings of the fifth ACM conference on Hypertext, pp. 106-117.*
Microsoft, Microsoft Word 2000, Copyright 1999, Microsoft Corporation, 9.0.6926 SP-3, figure 5.*
Michael Horwith; *"Those Omnipresent Yellow Sticky Notes "*; Data Based Advisor—Nov. 1994; pp. 134, 136-137, 140-141.

* cited by examiner

*Primary Examiner*—Tadesse Hailu
*Assistant Examiner*—Alvin Tan
(74) *Attorney, Agent, or Firm*—Merchant & Gould P.C.

(57) ABSTRACT

Described is a mechanism for visually categorizing electronic notes so that important information within the notes can be easily discerned. More specifically, a user may request to categorize an object (i.e., a note) in a document that is being displayed on a screen. The request may be received through a menu selection, a short-key combination, an ink gesture, and the like. The request specifies which one of several visual indicators to apply to the object. When the visual indicator is applied, the object becomes distinguishable from other objects displayed in the document on the screen. The visual indicator may be displayed in proximity to the object on the screen and may have a formatting attribute therewith which is applied to the object, such as changing a font color for the object, highlighting the object and the like. Each of the several visual indicators is visually distinct.

24 Claims, 11 Drawing Sheets

| INK GESTURE | DESCRIPTION | RESULT |
|---|---|---|
| ▱ | SQARE | APPLY THE MOST RECENTLY USED NOTE TAG THAT CONTAINS THE CHECKBOX SHAPE |
| ☆ | FIVE POINT STAR | APPLY THE MOST RECENTLY USED NOTE TAG THAT CONTAINS THE FIVE POINT STAR SHAPE |
| – · | EXCLAMATION POINT | APPLY THE MOST RECENTLY USED NOTE TAG THAT CONTAINS THE EXCLAMATION SHAPE |
| ↑ | ARROW (RIGHT OR LEFT) | APPLY THE MOST RECENTLY USED NOTE TAG THAT CONTAINS THE ARROW SHAPE |
| ✓ | CHECKMARK | CHANGE FROM UN-CHECKED TO CHECKED MARK AND VICE-VERSA |

*Fig. 8*

| Ordering | Visual Indicator | Label | High-Light | Font Color |
|---|---|---|---|---|
| 1 Default | ☑ | Action Item - Normal Priority | None | None |
| 2 | ☑ | Action Item - High Priority | None | Red |
| 3 | ☑ | Action Item - Urgent! | Red | White |
| 4 | A | Note Summary | Yellow | None |
| 5 | ✱ | Personal To-Do | None | None |
| 6 | ↑ | Personal Reminder | Blue | White |
| 7 | ✱ | Important Information | Yellow | None |
| 8 | ! | Hot Issue | None | None |
| 9 | A | Key Takeaway | Green | None |

SYSTEM AND METHOD FOR VISUALLY CATEGORIZING ELECTRONIC NOTES

BACKGROUND OF THE INVENTION

In the fast past world of today, there are numerous software applications and electronic devices that claim the ability to help one get organized and to work smarter. These applications and devices are commonly, collectively, referred to as personal information managers (PIMs). PIMs harness the power of the computer to make time management easier and more effective. They provide powerful tools to simplify e-mail communication, streamline group planning and scheduling, and provide access to information all in one place.

However, even with all these PIMs available, many people still resort to a simple piece of paper to jot down a note, such as a phone message. These notes then begin to clutter one's desktop and eventually may become lost or forgotten. Similarly, people typically use a pen and paper, not a PIM, for taking notes at a meeting. Later, the individual typically "re-purposes" these notes to form part of an email, document, or the like, or to schedule a meeting, reminder, task, or the like. This re-purposing typically requires the individual to re-enter some of the information contained within the note into a new form.

Some devices are now being developed to provide an alternative to these paper notes by offering the ability to electronically take notes. Then, instead of using a pen and paper, the individual uses a stylus on the screen to take notes. The resulting electronic notes are then stored on the device's storage system for later retrieval and viewing. While these devices provide a great step towards foregoing paper and pen, in practice, the notes that are taken are about as useful as the paper notes of past. For example, typically, the individual will need to "re-purpose" these notes, but now when the individual views these electronic notes, the notes appear as a monotonous display of text. Also, because these notes may have been written randomly during a meeting or throughout the day, the individual cannot easily discern or understand the important content within the notes. Thus, electronic notes offer little advantage over paper notes.

Therefore, the current state of the art does not support an ideal solution for electronic note taking.

SUMMARY OF THE INVENTION

The present invention is directed at a system and method for categorizing electronic notes so that important information within the notes can be easily discerned, which allows an individual to more easily re-purpose the important information for follow-on activities based on the categorization.

In one aspect, the invention is directed at a system and method for visually categorizing electronic notes on a screen. When a request to categorize an object is received, the request specifies which one of several visual indicators is applied to the object. The visual indicator is then associated with the object in a manner such that the object becomes distinguishable from other objects within a document that is being displayed on the screen. The visual indicator may be displayed in proximity to the object on the screen. In a further refinement, when the visual indicator is associated with the object, a formatting attribute associated with the visual indicator is applied to the object, such as changing a font color for the object, highlighting the object and the like. Each of the several visual indicators is visually distinct. Thus, after applying one of the visually distinct indicators to the object, the object becomes more readily identifiable within the document.

In another aspect of the invention, the invention is directed at a data structure for categorizing electronic notes on a screen. The data structure includes a label field that provides a textual description for a priority assigned to a note tag and a shape field that identifies one of several visual indicators. The data structure further includes a created field that identifies a time at which the one visual indicator became associated with an object displayed on the screen and became displayed on the screen in proximity to the object. In this embodiment, the visual indicator may be a static visual indicator. However, in a further refinement, the data structure may include a checked field that indicates a state for the one visual indicator. The checked field undergoes a change in the state if the visual indicator is selected. In another refinement, the shape field includes a format attribute associated with the visual indicator and the format attribute is applied to the object when the one visual indicator becomes associated with the object.

DETAILED DESCRIPTION OF THE PREFERRED EMBODIMENT

The inventors of the present invention have recognized that one of the problems with current electronic note-taking devices is that the devices do not provide an easy way to distinguish important notes that require follow-on activities with purely informational notes. To that end, the present invention provides a system and method for visually categorizing electronic notes. These visually categorized electronic notes can then be easily distinguished from other notes when viewing the electronic notes on a screen. By distinguishing important notes from other notes in accordance with the present invention, individuals can more easily re-purpose the important information for follow-on activities.

Figure 1:
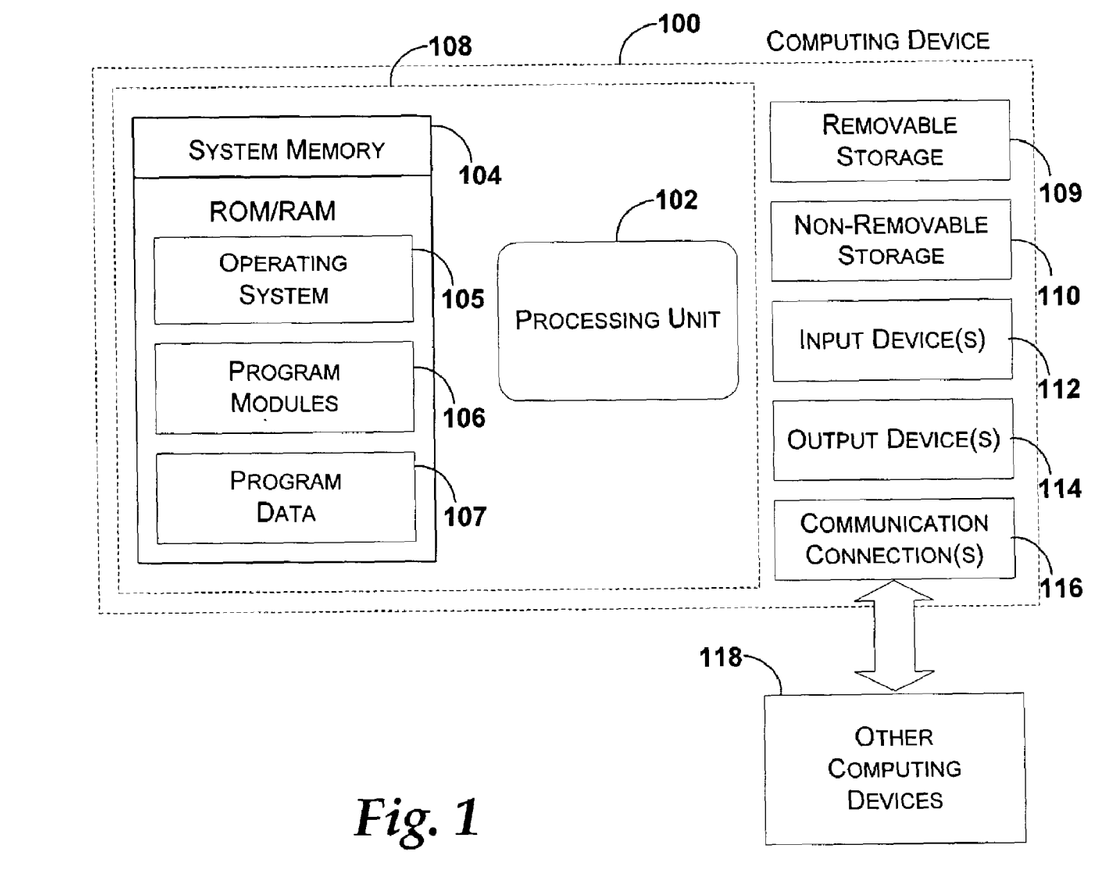
FIG. 1 illustrates an exemplary computing device that may be used in one exemplary embodiment of the present invention.

FIG. 1 illustrates an exemplary computing device that may be used in one exemplary embodiment of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
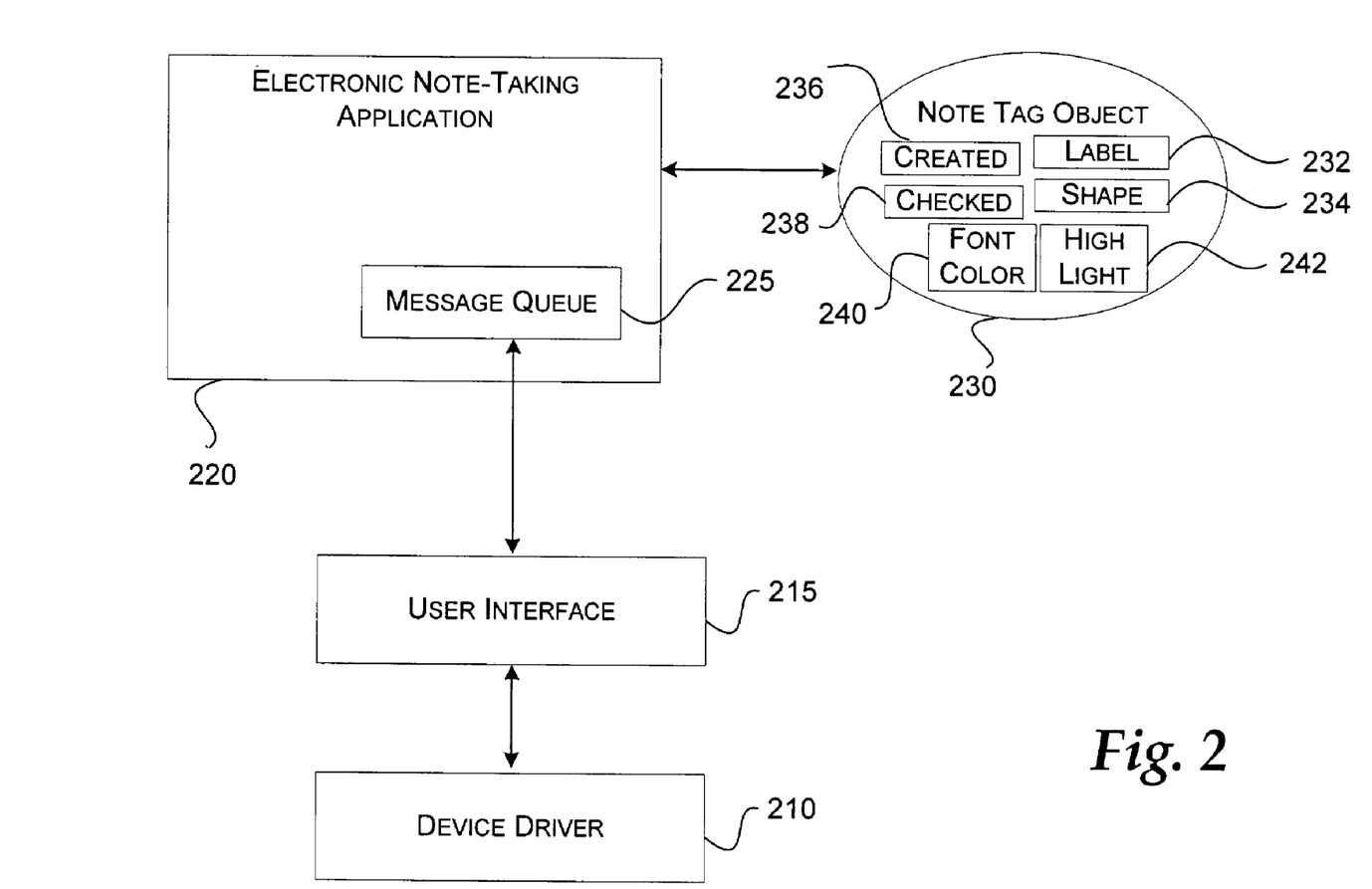
FIG. 2 is a functional block diagram illustrating components of a software environment in which the present invention may be implemented.

FIG. 2 is a functional block diagram illustrating components of a software environment in which the present invention may be implemented. Shown in FIG. 2 is an electronic note-taking application 220 that includes word processing functions as well as other functions to enable a user to visually categorize data that has been entered. In one example, the electronic note-taking application 220 may be a word processing application or the like. One function of the electronic note-taking application may be to record data that has been input. Sometimes this data may be entered in a haphazard manner, such as during a meeting or phone conversation. Thus, another function of the electronic note-taking application is to visually categorize these haphazard entries in a manner such that an individual can easily discern the important entries.

As illustrated in FIG. 2, the present invention may include a note tag object 230. The note tag object 230 may have many properties, some of which may include a label 232, a shape 234, a created property 236, a checked property 238, a font color 240, and a highlight property 242. Those skilled in the art will appreciate that many other properties may be associated with note tag object, such as properties for applying additional formatting options, for performing actions, and the like. The electronic note-taking application 220 includes mechanisms, described in greater detail below, for visually categorizing data that is displayed on a screen. As will be described in detail below, the electronic note-taking application associates the note tag object with some of the data on the screen.

Also shown in FIG. 2 is a device driver 210 associated with the input device. The device driver 210 receives signals from the input device, such as a keyboard, a touch-sensitive screen, and the like. In response to such a signal, the device driver 210 is typically configured to indicate the existence of the signal to an operating system, often referred to as "firing" or "raising" an "event." The operating system may then handle the event in any conventional manner. Often, in the case of input device drivers, a user interface module 215 retrieves the signal from the device driver 210. The user interface module 215 may then make the signal available to other software modules that have indicated an interest in the particular event raised.

Most software applications, such as the electronic note-taking application 220, receive user input events, including those received from a keyboard. Typically, software applications include a message queue 225 into which the user interface module 215 posts signals from input devices. In the current example, the device driver 210 receives a signal from an input device, such as the keyboard or touch-sensitive screen, the user interface module 215 retrieves the signal from the device driver 210 and posts the signal to message queue 225 of the electronic note-taking application 220. At that point, the electronic note-taking application 220 may handle the message in any practical way. In accordance with the present invention, the electronic note-taking application 220 handles the messages by recording data on the screen as the data is input and by applying a note tag to the recorded data when requested. By applying note tags as a visual indicator on the screen, the electronic note-taking application is more useful than existing software applications for note taking.

Figure 3:
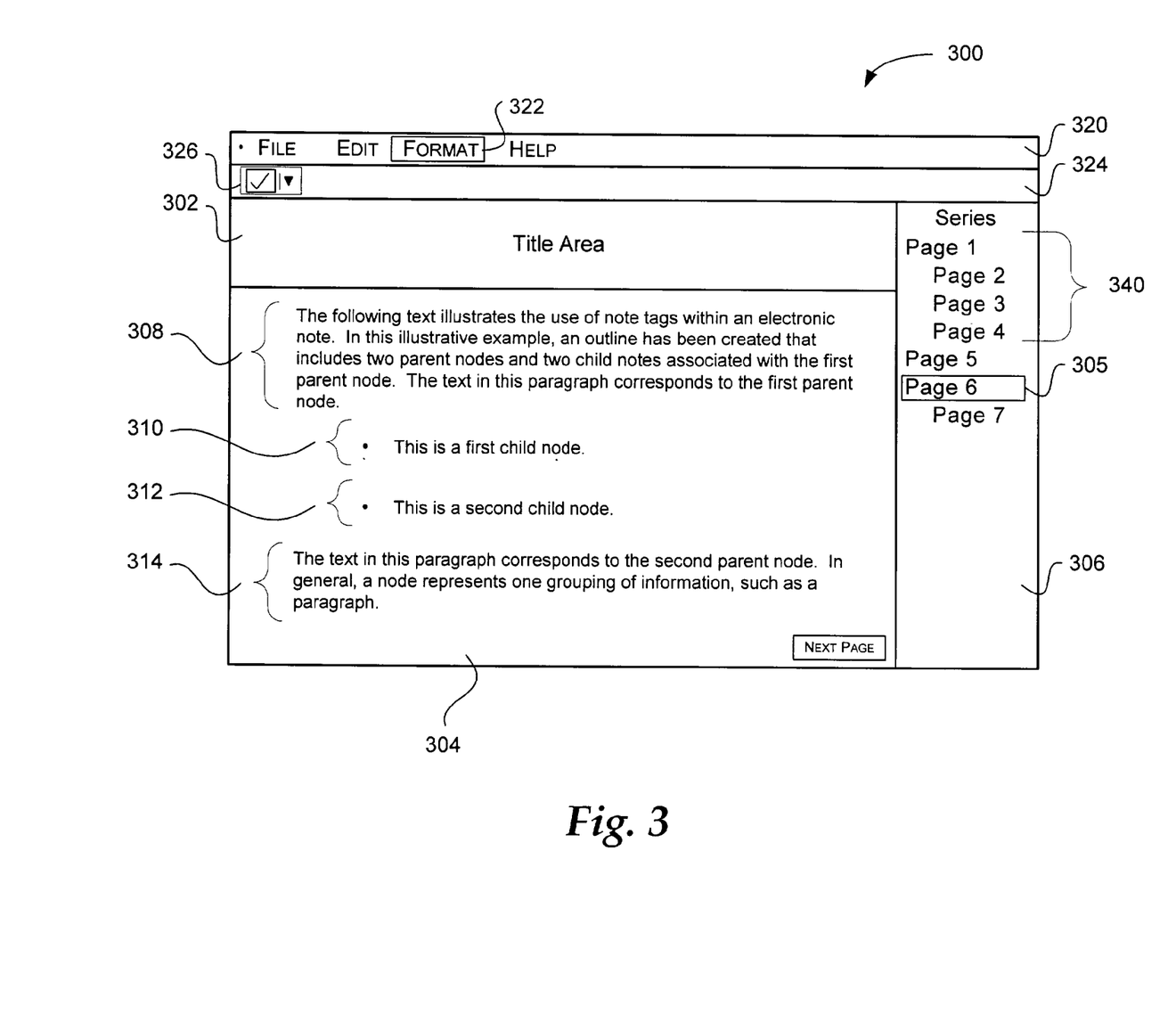
FIGS. 3–5 is a series of exemplary screen shots of a user interface that may be presented by the electronic note-taking application of FIG. 2, the series visually depicts a process for categorizing electronic notes in accordance with one implementation of the invention.
Figure 4:
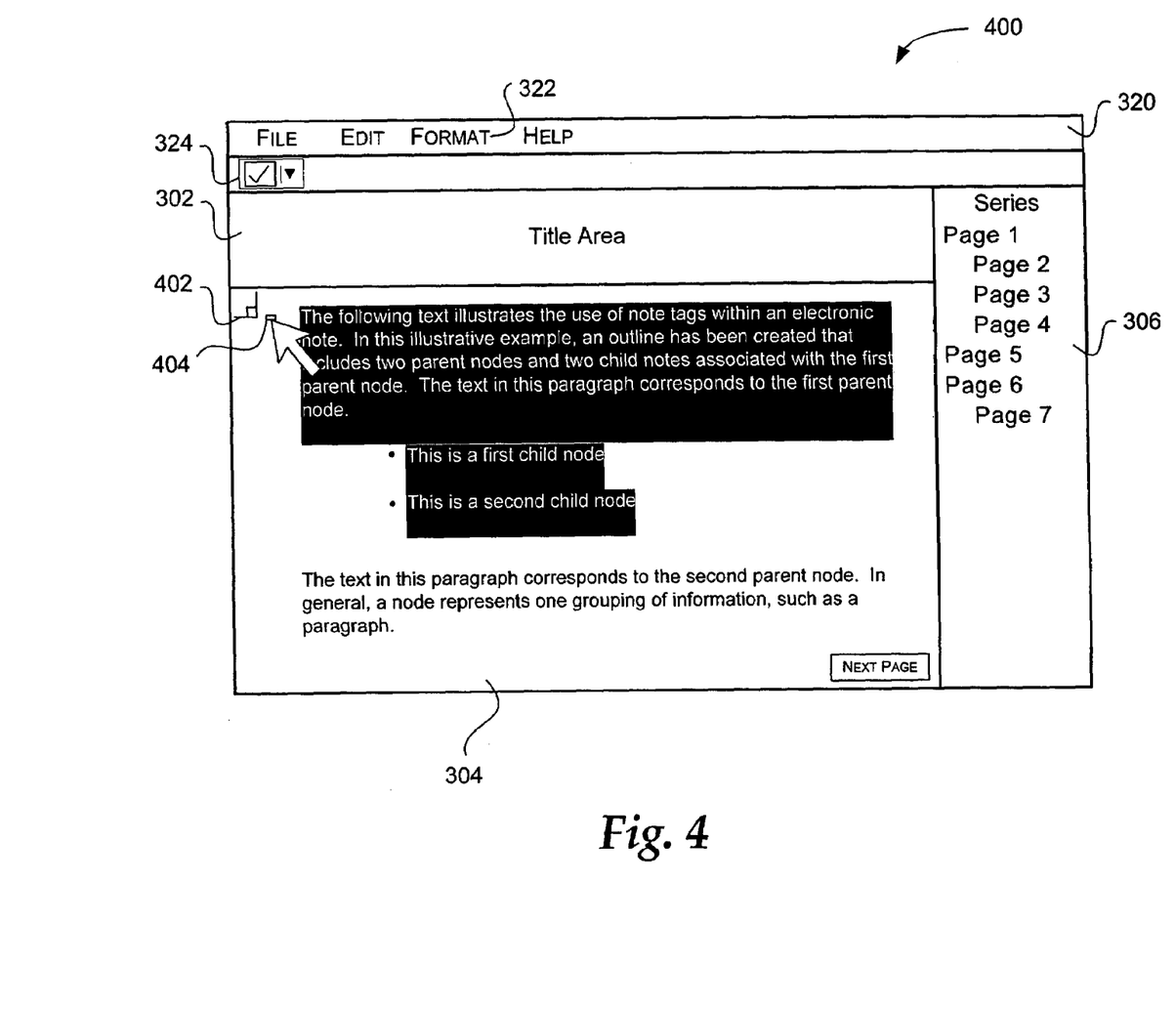
Figure 5:
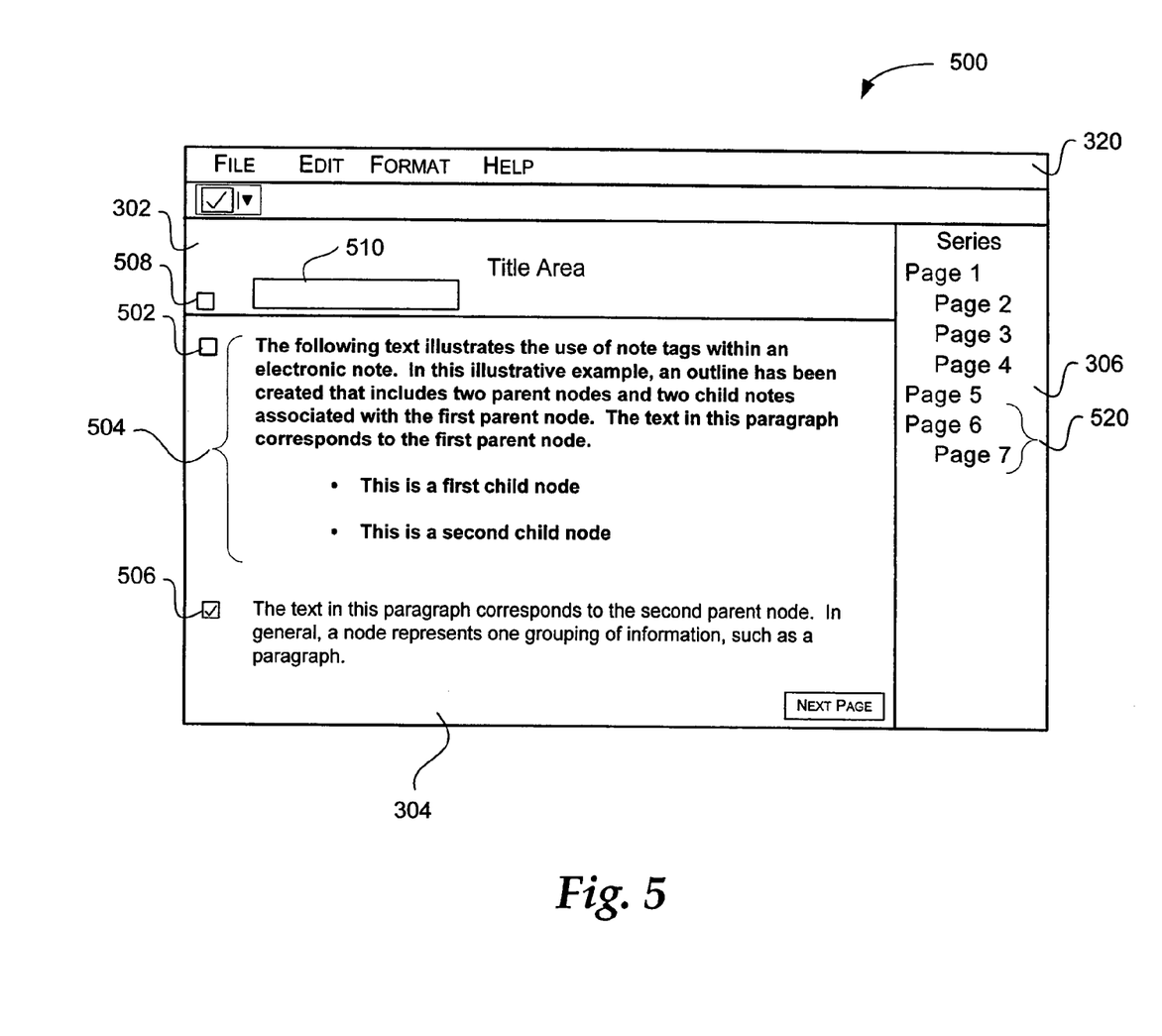

FIGS. 3–5 are a series of exemplary screen shots of a user interface that may be presented by the electronic note-taking application of FIG. 2. The series of screen shots visually depict a process for categorizing electronic notes in accordance with one implementation of the invention. Like references numerals are used throughout the series of exemplary screen shots to denote like parts.

Shown in FIG. 3 is a window 300 including a title pane 302, a note pane 304, and a page selection pane 306. The page selection pane 306 includes a plurality of page identifiers (e.g., Page 1, Page 2) for easily changing a page that is shown in the note pane 304. The page selection pane 306 also allows the grouping of relevant pages into a series (e.g., series 340). In the embodiment illustrated in FIG. 3, this grouping is achieved by indenting each page identifier after a first page identifier in the series. Those skilled in the art will appreciate that there are many alternative techniques for visually depicting pages and series. More importantly, once this grouping has been done, the notes appearing on the pages within the series 305 may be categorized without categorizing each individual note on each page of the series.

The note pane 304 displays notes (i.e., electronic notes) that have been entered by an individual. The notes include text, ink drawings, mathematical formula, sound files, picture files, video files, and the like. The notes may appear on the page using convention methods, such as typing, cutting and pasting, and the like. In FIG. 3, the notes include text that has been entered through conventional methods, such as keyboard, voice recognition, stylus on a screen, and the like. When the text is entered, the electronic note application groups the text into nodes (e.g., 308, 310, 312, 314). Therefore, each node 308–314 attempts to reflect a continuous thought of information as input by an individual. The electronic note application may recognize an enter key as a start of a new node. The node may represent a top-level thought (i.e., parent node 308 and 314) or a sub-level thought (i.e., child node 310 and 312). For purposes of the following discussion, a top-level thought refers to text this is considered important. A sub-level thought refers to text that is considered supportive or informative to one of the top-level thoughts. Then, in accordance with the present invention, each of these notes may be visually categorized as will be described below.

Window 300 also includes a menu bar 320 with a Format option 322. Briefly, described later in detail in conjunction with FIG. 6, the Format option 322 provides one means for categorizing the electronic notes. Also associated with window 300 is a toolbar 324 with a note tag tool 326. Note tag tool 326 provides another means for categorizing the electronic notes and is described later in detail in conjunction with FIG. 7.

Turning to FIG. 4, a window 400 is shown. Window 400 is similar to window 300 shown in FIG. 3. However, the reference numbers for nodes 308–314 have been removed from window 400 for clarity. The text associated with nodes 308–314, however, are still illustrated in window 400. Window 400 illustrates an outline icon 402 indicating that an individual has selected an outline format. The outline format provides an outline handle 404 to conveniently select an object associated with the outline handle. Thus, FIG. 4 illustrates a cursor hovering over the outline handle 404. By selecting the outline handle 404 using conventional methods, the object (e.g., nodes 308–312) becomes selected. This selection of nodes 308–312 is graphically shown in window 400 by drawing the text in reverse contrast (white text on black background). Once the object (e.g., nodes 308–312) that the individual wishes to categorize has been selected, the individual can chose one of several means for creating a note tag that becomes associated with the selected object. The individual may create more than one distinct note tag (i.e., visual indicator) that becomes associated with the same selected object.

FIG. 5 illustrates a window 500 after one of the several means for creating a note tag has completed. Thus, as shown in window 500, a visual indicator 502 (i.e., a note tag) now appears in proximity to the previously selected object (i.e., node 308). One can note that, for this embodiment, the visual indicator 502 appears in proximity to the more important thought (e.g., parent node 308) and does not appear near the informational thoughts (e.g., child nodes 310 and 312). By applying the visual indicator only to the parent node 308, the note pane 304 remains less cluttered. However, in another embodiment, the visual indicator 502 may appear next to each object that is the selection without departing from the scope of the present invention. In general, each visual indicator is graphically distinct.

Figure 9:
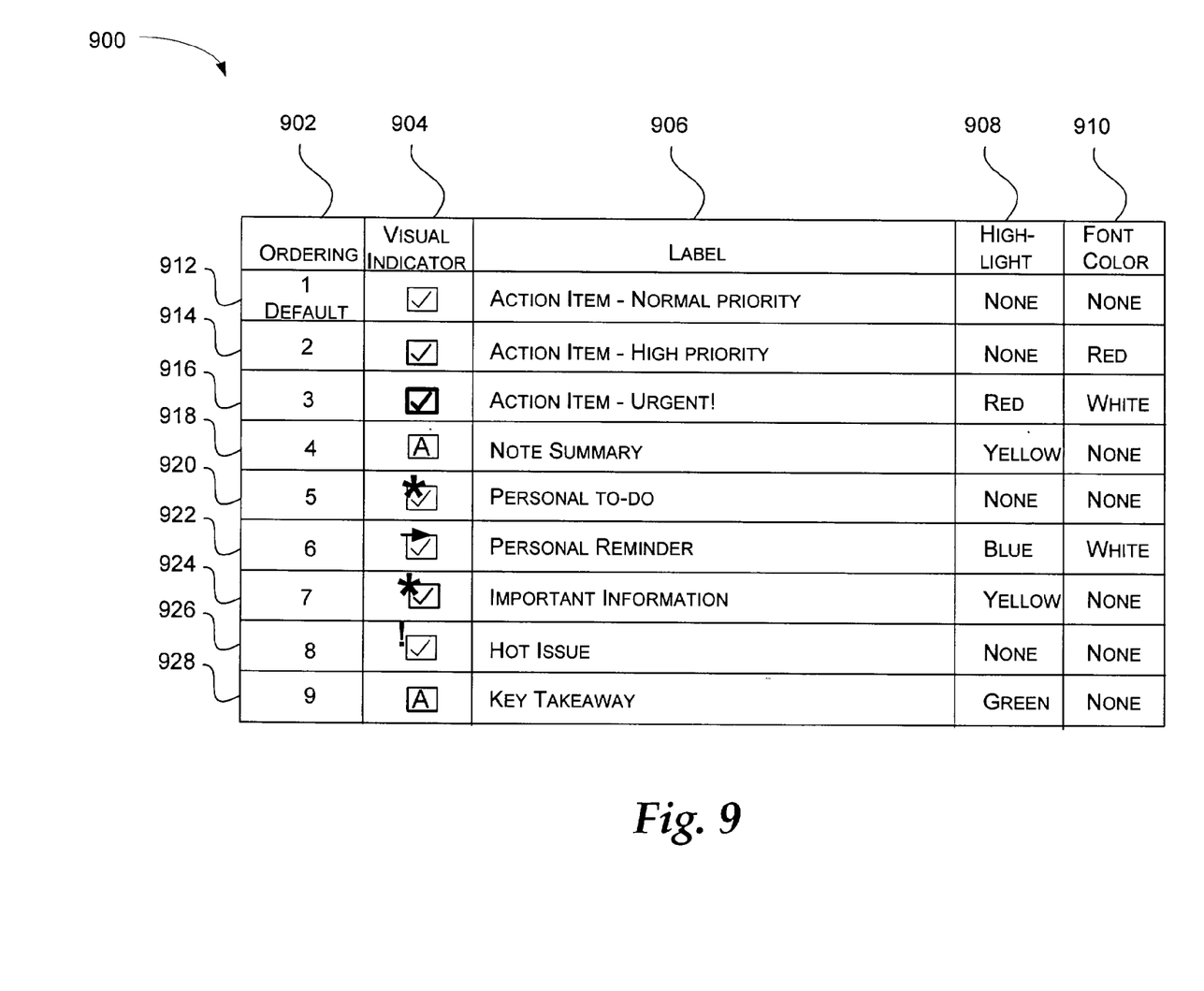
FIG. 9 is a diagram illustrating an exemplary categorization for note tags, in accordance with one implementation of the invention.

Turning briefly to FIG. 9, table 900 illustrates one exemplary set of visual indicators (i.e., note tags). This exemplary set can be modified, such as by re-defining the visual indicators within the set or changing the number of visual indicator within the set, without departing from the present invention. However, this exemplary set is limited to nine distinct visual indicators illustrated in rows 912–928. By limiting this exemplary set to nine distinct visual indicators, the inventors have recognized that a simple short-key combination, such as control key (CTRL) and a number 1–9, may be used to create one of the visual indicators and another simple short-key combination, such as control-shift and a number 1–9, may be used to toggle a state between a first state (e.g., unchecked) and a second state (e:g., checked) for the visual indicator. Therefore, table 900 includes a first column 902 for specifying a default order for applying the visual indicators. This default order then corresponds to the number 1–9 that is used in the short-key combinations above.

The table 900 includes a second column 904 for specifying the distinct visual indicator. In the embodiment illustrated in FIG. 9, each distinct visual indicator includes a shape (e.g., a square) and may include some other distinguishing indicator. The other distinguishing indicators may include a five-point star, an exclamation point, a right arrow, and a left arrow. A checkmark graphically displayed within the shape represents that the object associated with the visual indicator is in the second state (e.g., checked). As one skilled in the art will appreciate, other shapes could be used without departing from the scope of the present invention.

Table 900 further includes a third column 906, a fourth column 908, and a fifth column 910. The third column 906 displays a textual label associated with the distinct visual indicator (column 904) for the corresponding row. The fourth column 908 graphically represents whether a highlight is associated with the visual indicator and, if so, a color for the highlight. The fifth column 910 graphically represents whether a font color is associated with the visual indicator, and, if so, a color for the font. The shapes graphically illustrated in column 904 may appear on the screen in different colors. The different colors are shown in table 900 by progressively thicker line widths (see rows 912–916).

The visual indicator, label, highlight, and font color may each be customized to suit an individual's preferences. This customization may be performed through a series of drop down menus that display all possible combinations of shapes and other distinguishing indicators and allows the individual to choose the ones that are preferred. Likewise, a highlight dropdown menu, such as in conventional toolbar, may be used to associate a highlight with a visual indicator, and a conventional font color dropdown menu may appear in order to associate a font color with a visual indicator. Once an individual customizes the visual indicators, these customized visual indicators are stored and will then be displayed when adding new note tags, as will be described in more detail below. One will appreciate that this set of formatting options (e.g., highlight and font color) may be extended to provide greater flexibility without departing from the scope of the present invention.

Now, returning back FIG. 5, one will notice that visual indicator 502 is an "Action Item—High Priority" as shown in row 914 of table 900 (FIG. 9). Referring to FIG. 9, visual indicator 502 also has a format attribute associated therewith. The format attribute is a color RED for the font (column 910). Thus, object 504 that is associated with visual indicator 502 is shown as bold in FIG. 5 to represent the color RED. Window 500 also illustrates two other visual indicators (e.g., visual indicators 506 and 508) that have been applied in accordance with the present invention. Visual indicator 506 graphically illustrates the visual indicator in a checked state (denoted by a checkmark within the visual indicator). The checked state visually represents that actions for the object associated with the visual indicator have been completed, such as answering a question, completing an action item, and the like. Visual indicator 508 graphically illustrates the categorization of a series 520 of pages (e.g., Page 6 and Page 7). Thus, visual indicator 508 appears in the title pane 302 so that the visual indicator and the corresponding object 510 will remain visible when each page in the series is displayed in the note pane 304.

While the above series of screen shots illustrates the creation of a note tag after selecting an existing object, in another embodiment, the means for creating the note tag may occur before the object, to which it becomes associated with, exists. In this embodiment, when an individual creates the note tag and there is no object selected, a writing guide appears next to the created note tag. The text of the writing guide includes the label of the note tag. For example, if the label is "Action Item—High Priority", then the text associated with the writing guide may be "Write your Action Item—High Priority note here". In general, the writing guide includes an insertion point and a small text window for inputting data.

Figure 6:
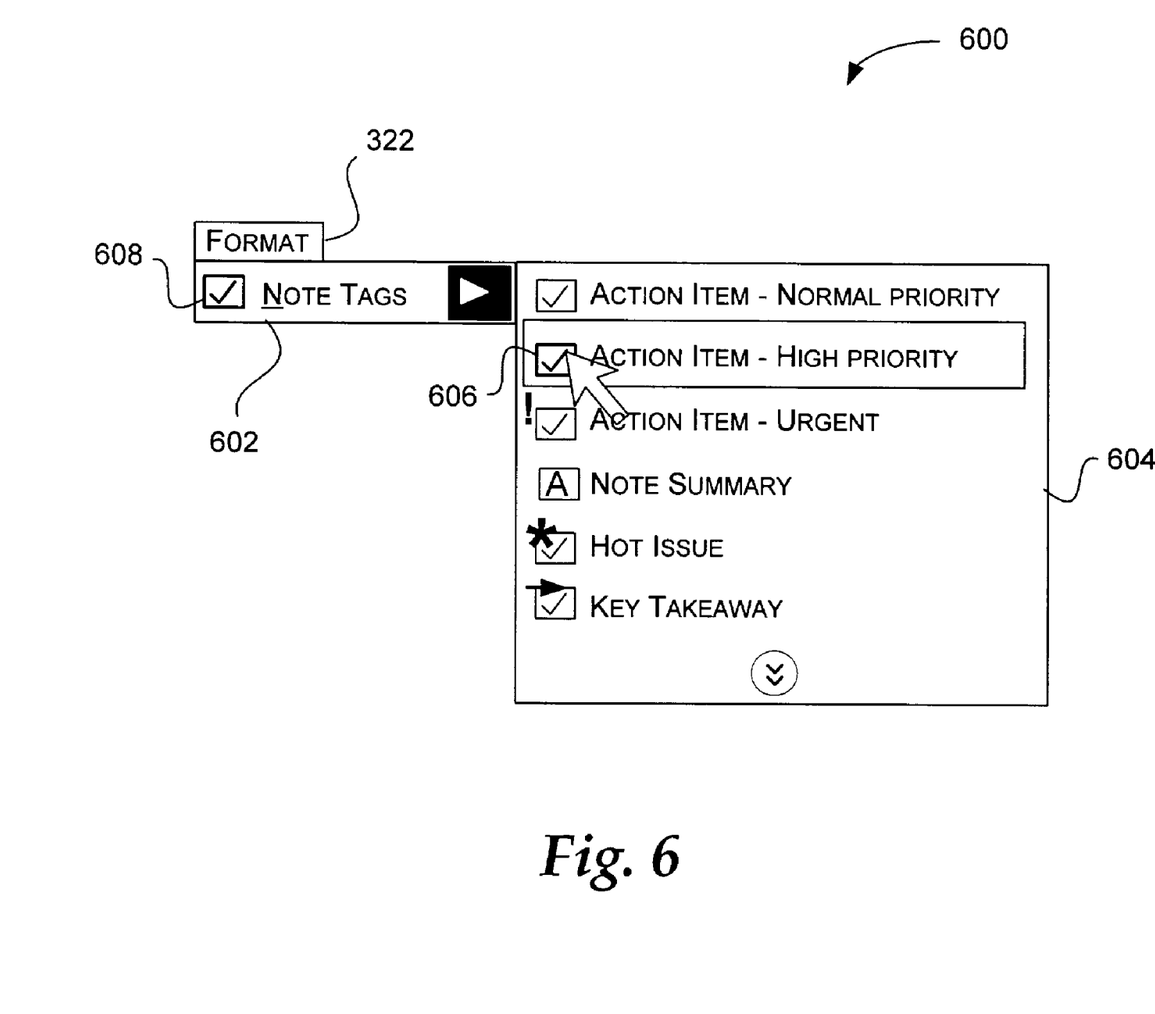
FIG. 6 is another exemplary screen shot of the user interface presented by the electronic note-taking application of FIG. 2 that illustrates an exemplary menu bar that is used in categorizing electronic notes in accordance with one implementation of the invention.

FIG. 6 is another exemplary screen shot of the user interface presented by the electronic note-taking application of FIG. 2 that illustrates an exemplary menu bar 600 that is used in categorizing electronic notes in accordance with one implementation of the invention. The menu bar 600 includes the Format option 322, which pulls down to a note tag sub-menu 602 having a sub-sub menu 604. The sub-sub-menu 604 graphically illustrates available visual indicators that can be applied to an object. The visual indicators that are displayed in sub-sub-menu 604 correspond to the ordering shown in a default list of visual indicators, such as described above in conjunction with FIG. 9. One of the visual indicators in the sub-sub-menu 606 may be selected using conventional methods, such as selecting menu item 606 with the cursor as shown in FIG. 6. A button 608 appearing in sub-menu 602 is then updated to reflect the visual indicator (i.e., selected menu item 606) that is selected from sub-sub-menu 604.

Figure 7:
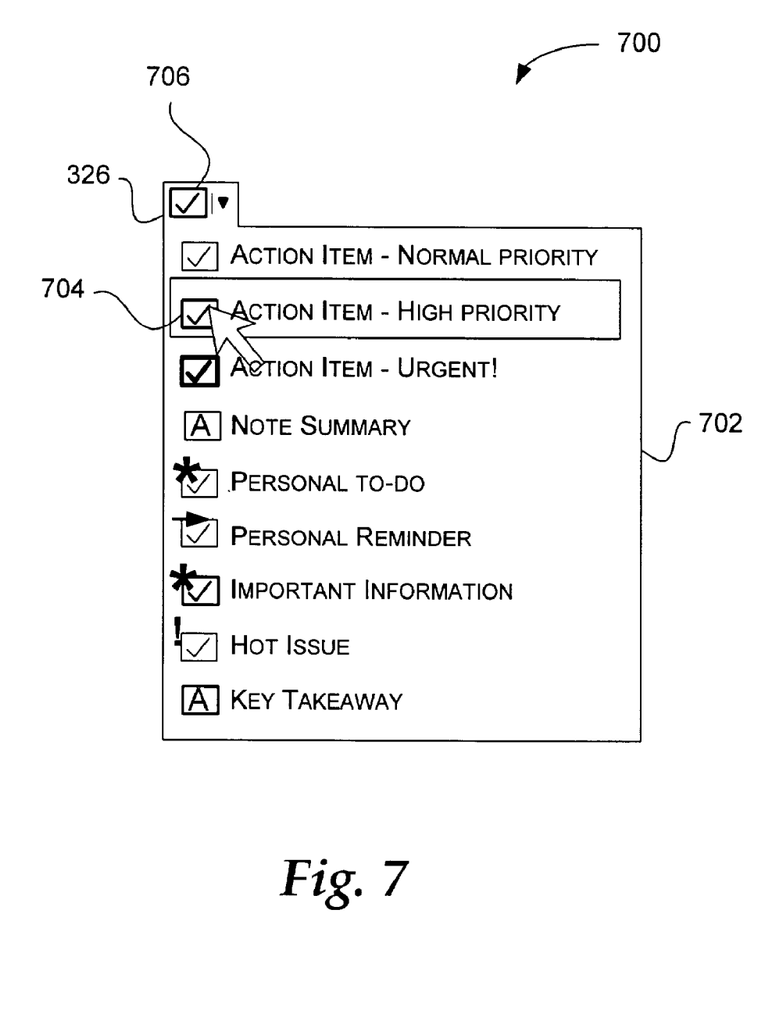
FIG. 7 is still another exemplary screen shot of the user interface presented by the electronic note-taking application of FIG. 2 that illustrates an exemplary toolbar that is used in categorizing electronic notes in accordance with another implementation of the invention.

FIG. 7 is still another exemplary screen shot of the user interface presented by the electronic note-taking application of FIG. 2 that illustrates an exemplary toolbar 700 that is used in categorizing electronic notes in accordance with another implementation of the invention. The tool bar 700 includes the note tag tool 326. The note tag tool 26 includes a drop-down menu 702 that graphically displays available visual indicators that can be applied to an object. Again, graphical representations of available visual indicators appear in drop-down menu 702. These graphical representations may be selected using conventional methods, such as selecting menu item 704 with the cursor as shown in FIG. 7. Also, the visual indicators that are displayed in drop-down menu 702 correspond to the ordering shown in a default list of visual indicators, such as described above in conjunction with FIG. 9. A button 706 appearing in note tag tool 326 is updated to reflect the visual indicator (i.e., select menu item 704) that is selected from drop-down menu 702.

Figure 8:
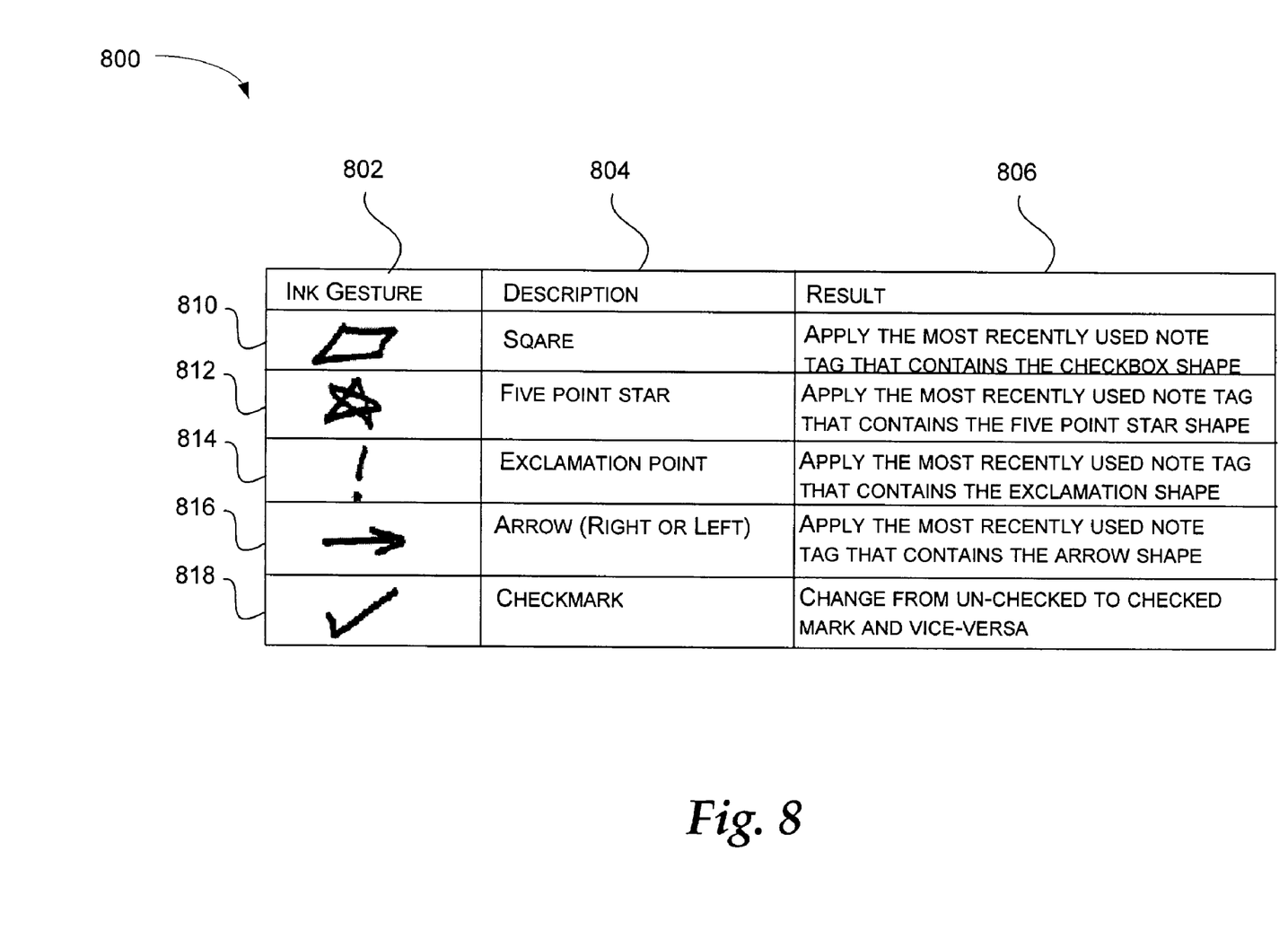
FIG. 8 is a diagram illustrating exemplary ink gestures for categorizing electronic notes, in accordance with yet another implementation of the invention.

FIG. 8 is a table 800 summarizing exemplary ink gestures for categorizing electronic notes, in accordance with yet another implementation of the invention. The exemplary ink gestures are shown in column 802. Column 804 describes the ink gestures and column 806 describes the resulting note tag that is created when the ink gesture is received in the electronic note taking application. There are six rows 810-818 each representing one of the exemplary ink gestures. In this embodiment, the ink gestures include a square, a five point star, an exclamation point, an arrow that can be either left or right, and a checkmark that correspond to rows 810–818, respectively. For each ink gesture, except for the checkmark, the electronic note taking application will apply the most recently used note tag that contains the shape associated with the ink gesture. For example, if the ink gesture is a square and a last note tag created having a square shape was at normal priority, the electronic note taking application will apply a square at normal priority in response to an ink gesture for a square.

Figure 10:
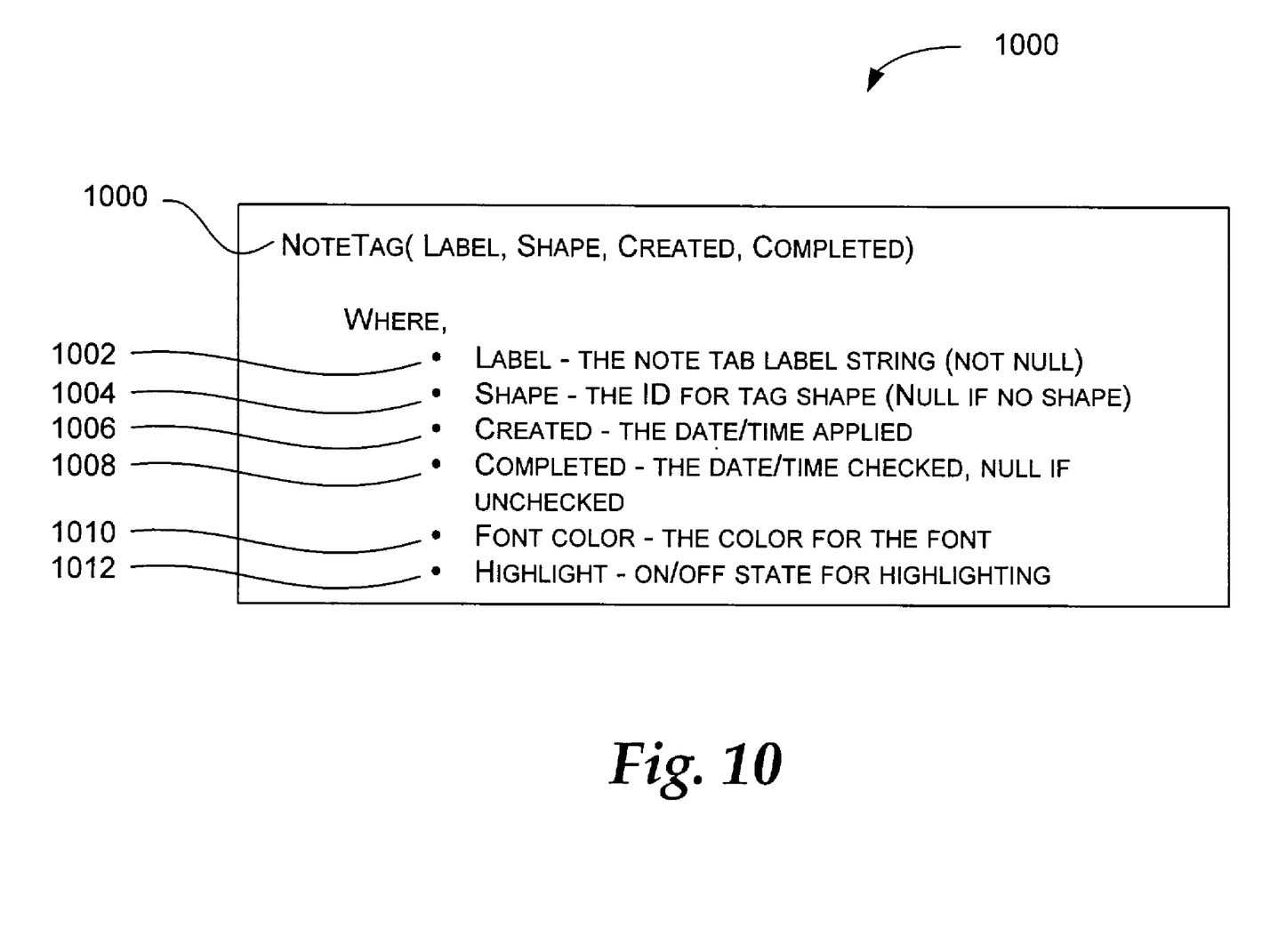
FIG. 10 is a diagram illustrating exemplary properties of a note tag, in accordance with one implementation of the invention.

FIG. 10 is a diagram illustrating exemplary properties of a note tag, in accordance with one implementation of the invention. The properties include a label property 1002, a shape property 1004, a created property 1006, a completed property 1008, a font color 1010, and a highlight property 1012. The label property 1002 stores the label string (column 906 in FIG. 9). The shape property 1004 stores an identifier for the shape associated with the note tag. The identifier may be a Globally Unique Identifier (GUD) or other unique identifier. The created property 1006 stores a data and time at which the associated note tag was created. The completed property 1008 stores a data and time, at which the note tag entered the second state (i.e., checked). If the date and time in the completed property 1008 is null, this represents that the associated note tag is in the first state (i.e., unchecked). These properties are added to an object each dine a note tag is created for the object. The properties are removed from the object if the note tag is removed or if the object associated with the note tag is deleted.

Figure 11:
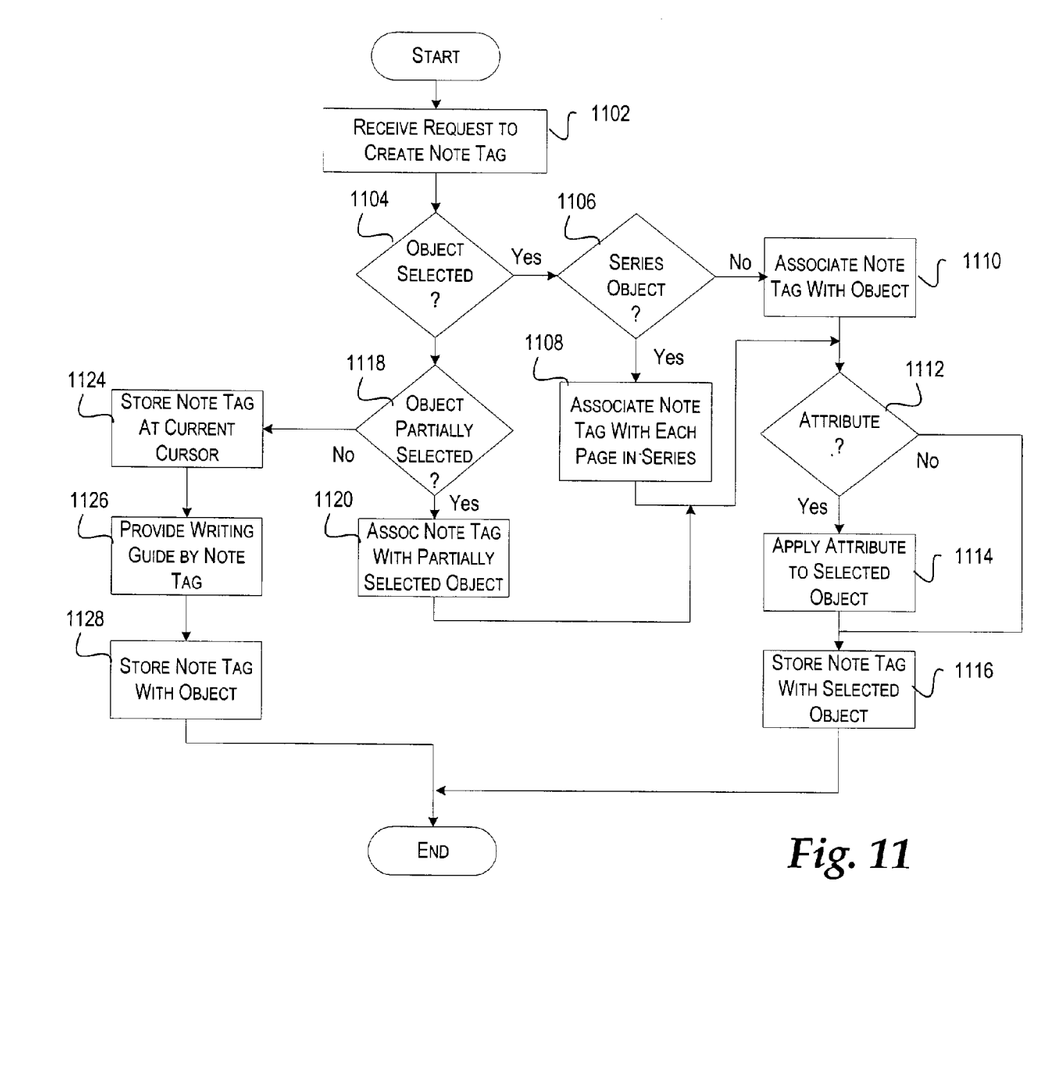
FIG. 11 is a flow diagram generally illustrating an overview of a process for categorizing electronic notes in accordance with one implementation of the invention.

FIG. 11 is a flow diagram generally illustrating an overview of a process for categorizing electronic notes in accordance with one implementation of the invention. The process begins after a document has been opened and is currently being viewed on a screen. The document is read/write enabled. Processing continues at block 1102.

At block 1102, a request to create a note tag is received. This request may via a control menu, an ink gesture, a short-key combination, and the like. At decision block 1104, a determination is made whether there is a current object that is selected on the screen. If there is a current selected object, processing continues at decision block 1106.

At decision block 1106, a determination is made whether the object that is selected represents a series object. As one may recall from the discussion above, if the object is a series object, the note tag comes associated with each note within each page of the series (block 1108). After that is done, processing proceed to decision block 1112.

Returning back to decision block 1106, if the selected object is not a series object, processing continues at block 1110. At block 1110, the note tag is associated with the selected object. As discussed above, if the selected object has multiple nodes, in one embodiment, only the top-level node has the note tag visually displayed near the node. Processing continues at decision block 1112.

At decision block 1112, a determination is made whether the note tag includes an associated attribute, such as for highlighting, changing font color, and the like. If it does, the attribute is applied to the selected object. For multiple nodes in the object, each node receives the proper formatting based on the type of object of that node (block 1114). The process continues at block 1116 as it does from decision block 1112 if there are no attributes associated with the note tag.

At block 1116, the note tag properties are stored with the selected object in the document. In general, the note tag data is stored as properties of the selection and as part of the page. Each of the note tag shapes are stored and displayed in the EMF (Enhanced Meta File) format so that the note tags scale with the point size without blurring. In addition, it allows sorting on the note tags to show the highest priority tasks in the document or across documents. The creation process is then complete.

Returning to decision block 1104, if there is not an object that is currently selected, processing continues to decision block 1118. At decision block 1118, a determination is made whether a cursor is positioned on an object or whether an object is partially selected. If either of these two cases exists, processing continues to block 1120.

At block 1120, the note tag is associated with the object pointed to by the cursor or partially selected. Processing then loops to decision block 1112 and proceeds as discussed above.

Returning to decision block 1118, if the cursor is not near an object and no object is partially selected, processing continues to block 1124. For example, this occurs when an individual knows before text is input that a note tag needs to be assigned to the text. The note tag appears on the screen based on a current cursor position. A writing guide is then provided to input the necessary note (block 1126). Once the note has been created, the note tag is stored with this object (block 1128) (e.g., note) as discussed above. Processing is then complete.

One can appreciate that there may be several other helpful User Interface (UI) displays available after the note tag is created. For example, a content menu may appear when a cursor hovers over a note tag. The context menu may include a check item, a clear check item, a remove note tag item, and an available note tag item. One skilled in the an will appreciate that additional helpful items may be included within the context menu. Also, one skilled in the art will appreciate that the above process may be performed multiple times with the same object being selected. When this occurs, as long as the note tag being created is not currently associated with the object, the additional note tag may appear on the screen and becomes associated with the object. The placement of the note tags on the screen may use conventional algorithms used in placing bullets and numbering before items in a list.

Once the electronic notes have been categorized, the electronic notes that have been categorized may be sorted, such as sorting by shape of the associated note tag. A window may then appear that graphically displays all electronic notes having a note tag associated therewith. This allows an individual to conveniently review important notes, such as questions, during a meeting, and make sure that each question is answered before concluding the meeting.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for visually categorizing electronic notes on a screen, the method comprising:
   receiving a shape that is associated with an ink gesture, wherein the shape is used to determine a visual indicator to apply;
   determining the visual indicator to apply to an object in a document that is being displayed on the screen based on the received shape by determining a most recently used visual indicator that contains the received shape; and
   associating the visual indicator to be applied with the object in a manner such that the object becomes distinguishable from other objects within the document.

2. The method of claim 1, further comprising displaying the associated visual indicator on the screen in proximity to the object.

3. The method of claim 1, wherein associating the visual indicator to be applied with the object is operative to apply a formatting attribute to the object if the formatting attribute is associated with the visual indicator to be applied.

4. The method of claim 3, further comprising receiving a request to categorize the object through a menu selection.

5. The method of claim 4, wherein the shape is at least one of: a square; a star, an exclamation point, an arrow, and a checkmark.

6. The method of claim 3, wherein the formatting attribute includes at least one of a highlight and a font color.

7. The method of claim 3, further comprising receiving a request to categorize the object through a toolbar selection.

8. The method of claim 3 further comprising receiving a request to categorize the object through depressing a shortcut key combination.

9. The method of claim 8, wherein the shape is at least one of: a square; a star, an exclamation point, an arrow, and a checkmark.

10. The method of claim 1, wherein the object corresponds to a selected object on the screen.

11. The method of claim 1, wherein the associated visual indicator may be sorted according to a priority and wherein the visual indicators across documents are categorized.

12. The method of claim 1, wherein each of the visual indicators has an associated shortcut key and wherein the shortcut key in combination with a second key changes a state of each of the visual indicators.

13. A computer-readable medium having computer instructions encoded thereon for visually categorizing electronic notes displayed on a screen, comprising:
   receiving a shape that is associated with an ink gesture, wherein the shape is used to determine a visual indicator to apply;
   determining the visual indicator to apply to an object in a document that is being displayed on the screen based on the received shape by determining a most recently used visual indicator that contains the received shape; and
   associating the visual indicator to be applied with the object in a manner such that the object becomes distinguishable from other objects within the document.

14. The computer-readable medium of claim 13, wherein the shape identifies a star, or an exclamation point, or an arrow.

15. The computer-readable medium of claim 13, further comprising displaying the associated visual indicator on the screen in proximity to the object.

16. The computer-readable medium of claim 13, wherein associating the visual indicator to be applied with the object is operative to apply a formatting attribute to the object if the formatting attribute is associated with the visual indicator to be applied.

17. The computer-readable medium of claim 16, further comprising receiving a request to categorize the object.

18. A system for visually categorizing electronic notes displayed on a screen, comprising:
- a processor; and
- a memory into which a plurality of instructions are loaded, the plurality of instructions performing a method comprising:
  receiving a shape that is associated with an ink gesture, wherein the shape is used to determine a visual indicator to apply;
  determining the visual indicator to apply to an object in a document that is being displayed on the screen based on the received shape by determining a most recently used visual indicator that contains the received shape; and
  associating the visual indicator to be applied with the object in a manner such that the object becomes distinguishable from other objects within the document.

19. The system of claim 18, further comprising displaying the associated visual indicator on the screen in proximity to the object.

20. The system of claim 18, wherein associating the visual indicator to be applied with the object is operative to apply a formatting attribute to the object if the formatting attribute is associated with the visual indicator to be applied.

21. The system of claim 18, further comprising receiving a request to categorize the object through a menu selection.

22. The system of claim 18, further comprising receiving a request to categorize the object through a toolbar selection.

23. The system of claim 18, further comprising receiving a request to categorize the object through depressing a shortcut key combination.

24. The system of claim 18, wherein the shape is either: a square; a star, an exclamation point, an arrow, or a checkmark.

* * * * *